United States Patent [19]

Fujita et al.

[11] Patent Number: 4,639,782
[45] Date of Patent: Jan. 27, 1987

[54] VIDEO SIGNAL PROCESSING APPARATUS FOR PROCESSING A VIDEO SIGNAL WHICH IS TRANSMITTED IN ACCORDANCE WITH A DOT INTERLACED SCHANNING SYSTEM AND INPUTTED THERETO

[75] Inventors: Akira Fujita; Kyoichi Shimizu, both of Yokohama, Japan

[73] Assignee: Victor Company of Japan, Ltd., Yokohama, Japan

[21] Appl. No.: 701,137

[22] Filed: Feb. 13, 1985

[30] Foreign Application Priority Data

Feb. 15, 1984 [JP] Japan .................................. 59-26604

[51] Int. Cl.[4] ........................ H04N 5/21; H04N 5/208
[52] U.S. Cl. ....................................... 358/166; 358/37
[58] Field of Search ..................... 358/10, 36, 37, 140, 358/166, 167

[56] References Cited

FOREIGN PATENT DOCUMENTS 59-104866  6/1984  Japan ..................................... 358/11

Primary Examiner—James J. Groody
Assistant Examiner—Robert M. Bauer
Attorney, Agent, or Firm—Michael N. Meller

[57] ABSTRACT

A video signal processing apparatus processes a video signal which is obtained by carrying out a dot interlaced scanning in terms of four fields so that picture element data which correspond to one field and in which the picture element data of first and third dot interlaced fields (or second and fourth dot interlaced fields) alternately exist on each line are transmitted during a time period of one field. The video signal processing apparatus comprises a luminance difference detecting part and an interpolation part. The luminance difference detecting part performs a detecting operation to detect a luminance difference between two luminance data which are belonged respectively to two mutually adjacent picture elements in the same line and are among the picture element data which correspond to one field. When the luminance difference detecting part detects a luminance difference between the two luminance data during two or more consecutive detecting operations, the interpolation part replaces one luminance data out of the two luminance data in which the luminance difference is detected by the other luminance data.

7 Claims, 34 Drawing Figures

PRIOR ART FIG. 1

| | | |
|---|---|---|
| LINE 1a | ①③①③①③①③①③ | FIELD A |
| LINE 1b | ②④②④②④②④②④ | FIELD B |
| LINE 2a | ③①③①③①③①③① | FIELD A |
| LINE 2b | ④②④②④②④②④② | FIELD B |

VIDEO SIGNAL PROCESSING APPARATUS FOR PROCESSING A VIDEO SIGNAL WHICH IS TRANSMITTED IN ACCORDANCE WITH A DOT INTERLACED SCHANNING SYSTEM AND INPUTTED THERETO

BACKGROUND OF THE INVENTION

The present invention generally relates to video signal processing apparatuses, and more particularly to a video signal processing apparatus which processes a video signal which is transmitted in accordance with a dot interlaced scanning system, without deteriorating the picture quality even when the original picture is a moving picture.

Generally, when an attempt is made to record and reproduce in an apparatus such as a video tape recorder (VTR) for home use having a relatively narrow recording and reproducing frequency band a video signal having a relatively wide frequency band of approximately 4.2 MHz, for example, the video signal becomes greatly attenuated especially in the high frequency band. As a result, the picture quality becomes deteriorated. Accordingly, the frequency band of the video signal must somehow be compressed at the time of the recording performed in the VTR and then expanded at the time of the reproduction performed in the VTR in order to prevent the picture quality from becoming deteriorated.

Between the luminance signal and the carrier chrominance signal of the video signal, it is the luminance signal that has a greater effect on the picture quality with respect to the human eye. For this reason, the luminance signal occupies a wider frequency band. Hence, the frequency band of the video signal can be compressed effectively by compressing the frequency band of the luminance signal.

In a television picture, an interlaced scanning takes place. Odd lines of the picture are scanned during an odd field and even lines of the picture are scanned during an even field. In other words, a picture corresponding to one frame is made up of an odd field and an even field. Generally, data related to all of the picture elements in one line are transmitted during one horizontal scan. However, according to a known dot interlaced scanning system, only the data related to every other picture elements in one line are sampled and transmitted during one horizontal scan, and as a result, the frequency band is compressed by ½. In other words, according to the dot interlaced scanning system, the data related to every odd numbered picture elements in each odd line are sampled and transmitted during the odd field and the data related to every even numbered picture elements in each even line are sampled and transmitted during the even field, for example. However, because only the data related to every other picture element in each line are sampled and transmitted according to the dot interlaced scanning system, the frequency band is reduced by ½ but the horizontal resolution becomes reduced by ½. Thus, there is a disadvantage in that the horizontal resolution becomes deteriorated according to the dot interlaced scanning system.

Therefore, a system of carrying out the dot interlaced scanning in terms of four fields was previously proposed so as to overcome the disadvantage of the dot interlaced scanning system. According to this previously proposed system, picture element data which correspond to one field and in which the picture element data of the first and third dot interlaced fields alternately exist on each line are transmitted during a time period of one field, and picture element data which correspond to one field and in which the picture element data of the second and fourth dot interlaced fields alternately exist on each line are transmitted during the next time period of one field, as will be described later on in the specification in conjunction with the drawings. However, according to this proposed system, the picture element data corresponding to one field are made up of the picture element data of the first and third fields (or second and fourth fields), that is, the picture element data of two different fields. Thus, no problems are introduced in the case where the original picture is a still picture. But when the original picture is a moving picture, a double picture is obtained, and there is a disadvantage in that the picture quality is greatly deteriorated. The double picture is a picture in which an image such as an automobile, for example, is displayed at two mutually shifted positions.

SUMMARY OF THE INVENTION

Accordingly, it is a general object of the present invention to provide a novel and useful video signal processing apparatus in which the disadvantages described heretofore are eliminated.

Another and more specific object of the present invention is to provide a video signal processing apparatus for processing a video signal which is obtained by carrying out the dot interlaced scanning in terms of four fields so that picture element data which correspond to one field and in which the picture element data of the first and third dot interlaced fields (or second and fourth dot interlaced fields) alternately exist on each line are transmitted during a time period of one field, which video signal processing apparatus comprises a luminance difference detecting part and an interpolation part. The luminance difference detecting part performs a detecting operation to detect a luminance difference between two luminance data which are related to two mutually adjacent picture elements in the same line and are among the picture element data which correspond to one field. When the luminance difference detecting part detects a luminance difference between the two luminance data during two or more consecutive detecting operations, the interpolation part replaces the luminance data obtained before the luminance difference is detected by corresponding luminance data among the picture element data which correspond to one field and are obtained after the luminance difference is detected. According to the apparatus of the present invention, the horizontal resolution will not be deteriorated in the case where the original picture is a still picture. Further, it is possible to compress the frequency band of the video signal by ½ and process the video signal without deteriorating the picture quality even in the case where the original picture is a moving picture.

Other objects and further features of the present invention will be apparent from the following detailed description when read in conjunction with the accompanying drawings.

DETAILED DESCRIPTION

Figure 1:
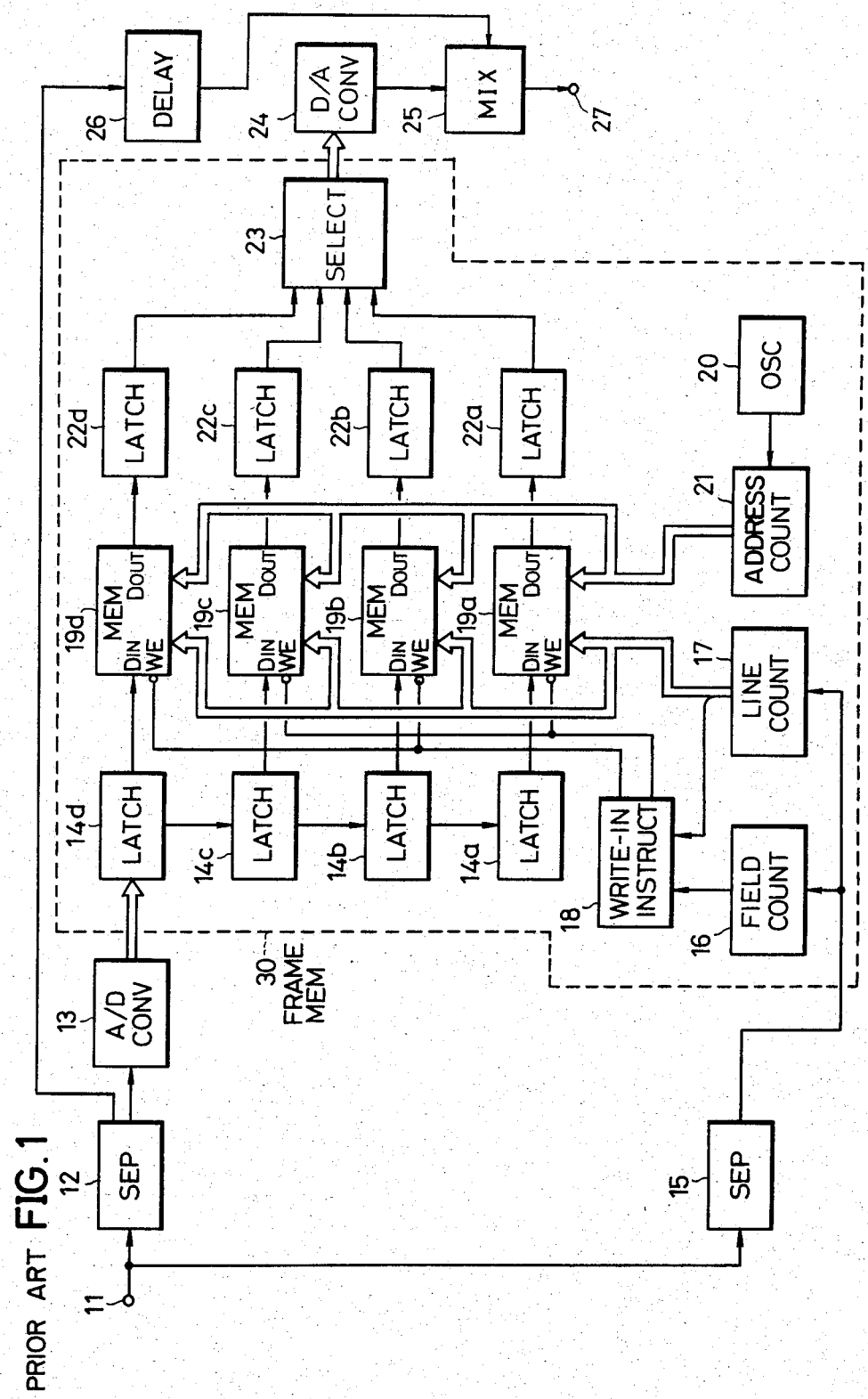
FIG. 1 is a systematic block diagram showing an example of a conventional video signal processing apparatus which carries out the dot interlaced scanning in terms of four fields.

First, a description will be given with respect to an example of a conventional video signal processing apparatus which carries out the dot interlaced scanning in terms of four fields, by referring to FIGS. 1 through 3. In FIG. 1, an input video signal which is obtained by carrying out the dot interlaced scanning in terms of four fields, is applied to an input terminal 11. When the dot interlaced scanning is carried out in terms of four fields, data related to odd numbered picture elements in odd lines and data related to even numbered picture elements in even lines are sampled and transmitted during the first and second fields. On the other hand, data related to even numbered picture elements in odd lines and data related to odd numbered picture elements in even lines are sampled and transmitted during the third and fourth fields.

The input video signal from the input terminal 11 is supplied to separating circuits 12 and 15. The separating circuit 12 separates the luminance signal and the carrier chrominance signal from the input video signal, and supplies the separated luminance signal to an analog-to-digital (A/D) converter 13 and supplies the separated carrier chrominance signal to a delay circuit 26. An output digital luminance signal of the A/D converter 13 is supplied to a latch circuit 14d within a frame memory 30. The frame memory 30 comprises latch circuits 14a through 14d, a field counter 16, a line counter 17, a write-in instructing circuit 18, memories 19a through 19d, an oscillator 20, an address counter 21, latch circuits 22a through 22d, and a selector 23.

The output digital luminance signal of the A/D converter 13 is successively supplied to the latch circuits 14a through 14d, and for example, luminance data related to odd numbered picture elements in odd lines of the first (or second) field are latched by the latch circuits 14a and 14c. Luminance data related to even numbered picture elements in even lines of the first (or second) field are latched by the latch circuits 14b and 14d. Similarly, luminance data related to even numbered picture elements in odd lines of the third (or fourth) field are latched by the latch circuits 14b and 14d, and luminance data related to odd numbered picture elements in even lines of the third (or fourth) field are latched by the latch circuits 14a and 14c.

On the other hand, the separating circuit 15 separates horizontal and vertical synchronizing signals from the input video signal. The separated horizontal synchronizing signal is supplied to a line counter 17, and the separated vertical synchronizing signal is supplied to a field counter 15. An output control signal of the line counter 17 responsive to the horizontal synchronizing signal and an output control signal of the field counter 16 responsive to the vertical synchronizing signal, are respectively supplied to the write-in instructing circuit 18. Accordingly, the luminance data which are latched by the latch circuits 14a through 14d responsive to output signals of the write-in instructing circuit 18, are written into the memories 19a through 19d for each line in each field. Write-in addresses within the memories 19a through 19d are designated by an output of the line counter 17 and an output of the address counter 21 which counts output clock pulses of the oscillator 20. The luminance data related to the odd numbered picture elements in the odd lines of the first (or second) field are written into the memories 19a and 19c, and the luminance data related to the even numbered picture elements in the even lines of the first (or second) field are written into the memories 19b and 19d. Similarly, the luminance data related to the even numbered picture elements in the odd lines of the third (or fourth) field are written into the memories 19b and 19d, and the luminance data related to the odd numbered picture elements in the even numbered lines of the third (or fourth) field are written into the memories 19a and 19c.

The luminance data which are written into the memories 19a through 19d are read out from read-out addresses which are designated by the outputs of the line counter 17 and the address counter 21, and the read out luminance data are latched by the latch circuits 22a through 22d. Accordingly, during a certain time period of one field, for example, the luminance data related to the odd numbered picture elements in one odd line of the first (or second) field are latched by the latch circuits 22a and 22c and the luminance data related to the even numbered picture elements in one even line of the third (or fourth) field are latched by the latch circuits 22b and 22d, as luminance data related to picture elements in one odd line. During this certain time period of one field, the luminance data related to the even numbered picture elements in one even line of the first (or second) field are latched by the latch circuits 22b and 22d and the luminance data related to the odd numbered picture elements in one even line of the third (or fourth) field are latched by the latch circuits 22a and 22c, as luminance data related to picture elements in one even line.

The luminance data which are obtained in parallel from the latch circuits 22a through 22d, are converted into serial data in the selector 23. An output serial signal of the selector 23 is converted into an analog luminance signal in a digital-to-analog (D/A) converter 24 is supplied to a mixer 25. On the other hand, the output carrier chrominance signal of the separating circuit 12 is delayed by a predetermined delay time in the delay circuit 26, and an output delayed carried chrominance signal of the delay circuit 26 is supplied to the mixer 25. Hence, during the certain time period of one field, the mixer 25 mixes the output carrier chrominance signal of the delay circuit 26 related to the third field and the output luminance signal of the D/A converter 24 made up of the luminance data of the first and third fields, for example, and a video signal corresponding to one field is produced through an output terminal 27. During another time period of one field, the mixer 25 mixes the output carrier chrominance signal of the delay circuit 26 related to the fourth field and the output luminance signal of the D/A converter 24 made up of the luminance data of the second and fourth fields, and a video signal corresponding to one field is produced through the output terminal 27.

Figures 2, 3:
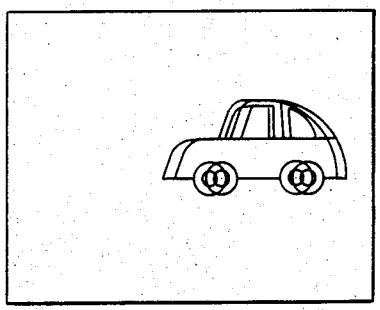
FIG. 2 shows the arrangement of picture element data which are transmitted by the conventional apparatus shown in FIG. 1.
FIG. 3 shows a double picture which is obtained in the conventional apparatus shown in FIG. 1 in the case where the original picture is a moving picture.

When the video signal (picture element data) obtained from the output terminal 27 is displayed (reproduced), the arrangement of the picture element data within the reproduced picture becomes as shown in FIG. 2. In FIG. 2, circles represent the positions of the picture elements, and the numerals inside the circles represents the field number. For example, the picture element data of the first and third fields alternately exist in a first line 1a of a field A, and the picture element data of the third and first fields alternately exist in a second line 2a of the field A. In the case where the original picture is a still picture, the information contents of two picture element data related to two mutually adjacent picture elements in the first line 1a of the field A, for example, are approximately the same. Thus, no problems will be introduced in the case where the original picture is a still picture. However, in the case where the original picture is a moving picture such as a picture of a moving automobile, the information contents of the two picture element data related to the two mutually adjacent picture elements in the first line 1a of the field A greatly differ. Accordingly, in the case where the original picture is a moving picture such as a picture of a moving automobile, a double picture shown in FIG. 3 is obtained, and there is a disadvantage in that the picture quality becomes greatly deteriorated. In the double picture shown in FIG. 3, the automobile is displayed at two mutually shifted positions.

Figure 4:
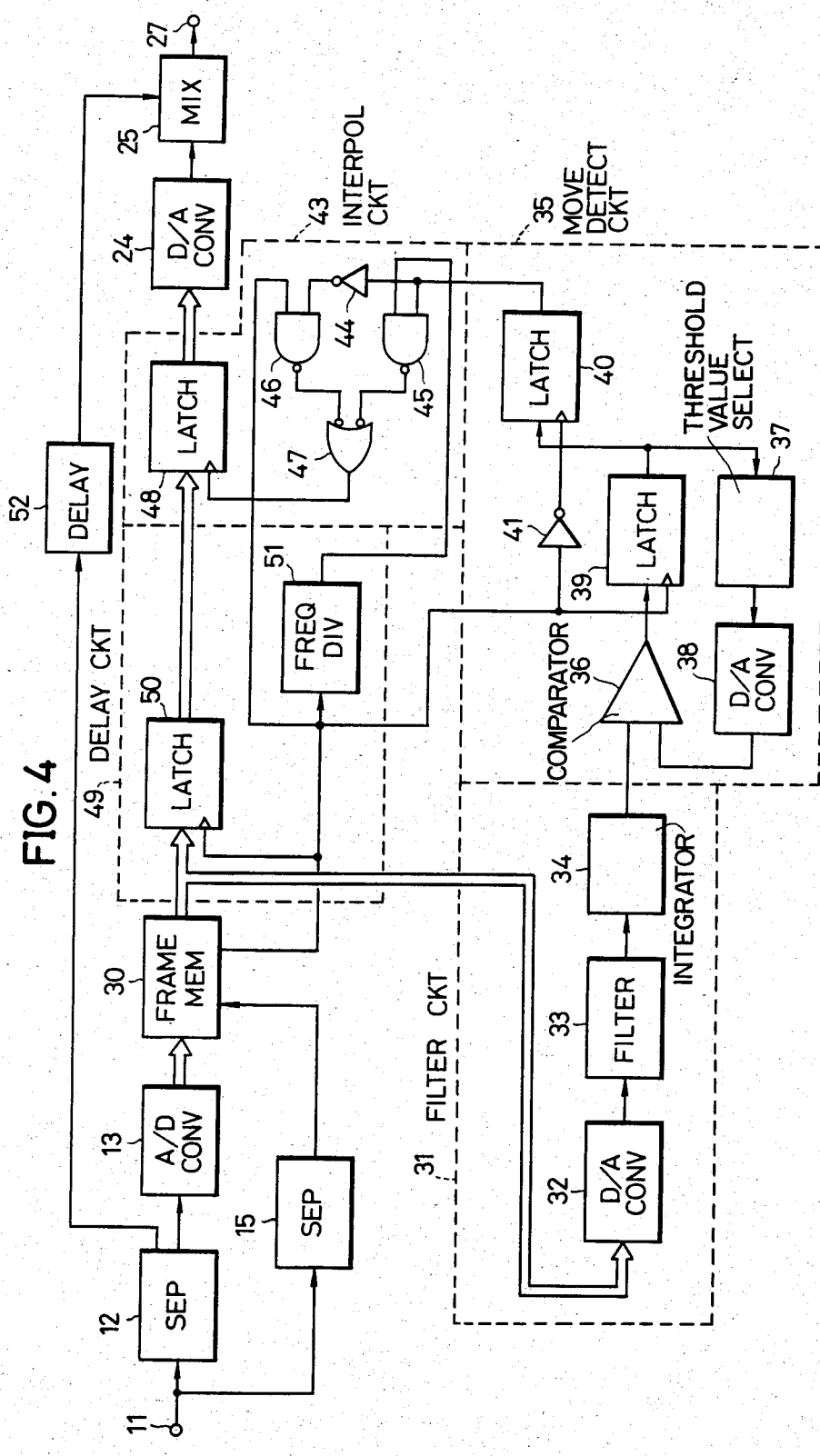
FIG. 4 is a systematic block diagram showing an embodiment of a video signal processing apparatus according to the present invention.
Figure 5:
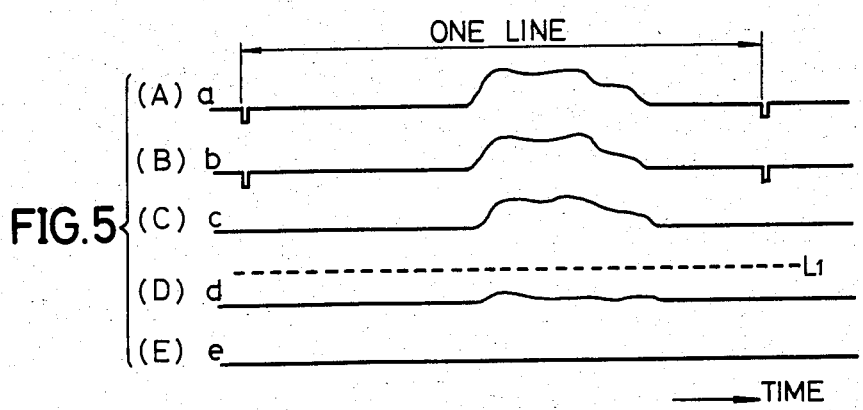
FIGS. 5(A) through 5(E) and FIGS. 6(A) through 6(J) respectively show signal waveforms for explaining the operation of the block system shown in FIG. 4 in the case where the original picture is a still picture.
Figure 6:
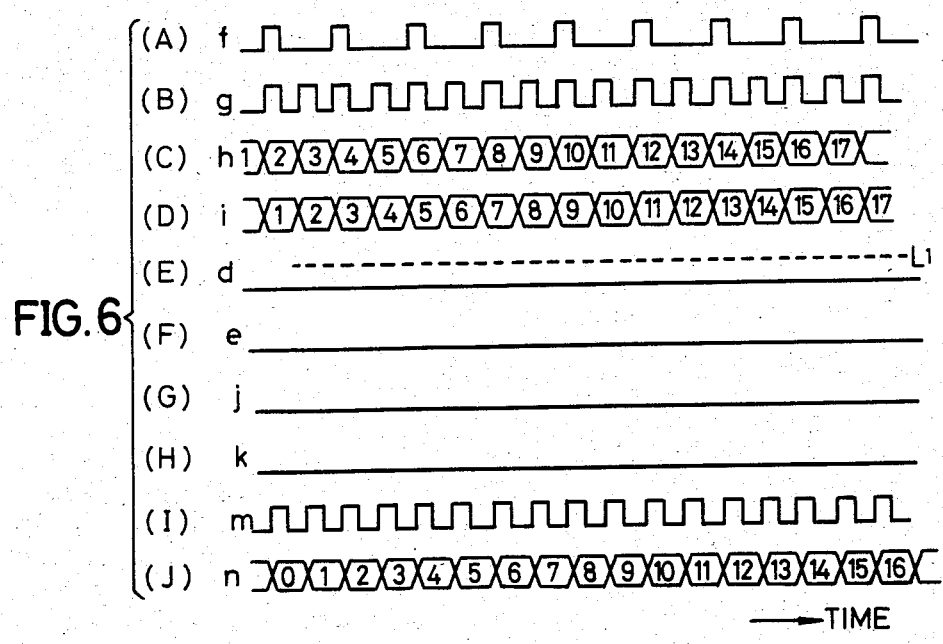
Figure 7:
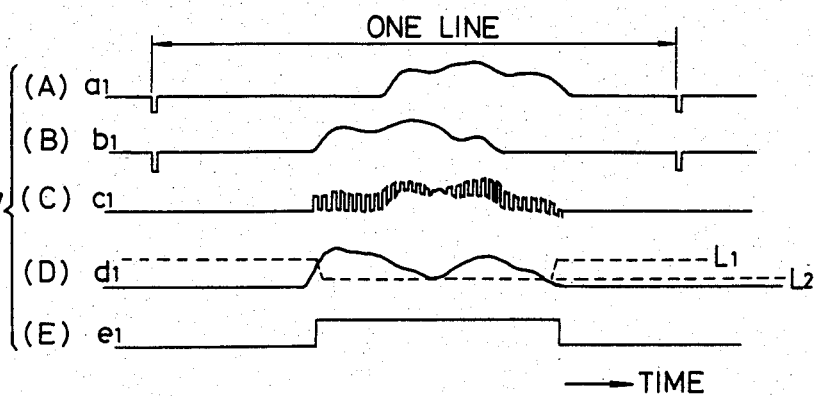
FIGS. 7(A) through 7(E) and FIGS. 8(A) through 8(J) respectively show signal waveforms for explaining the operation of the block system shown in FIG. 4 in the case where the original picture is a moving picture.
Figure 8:
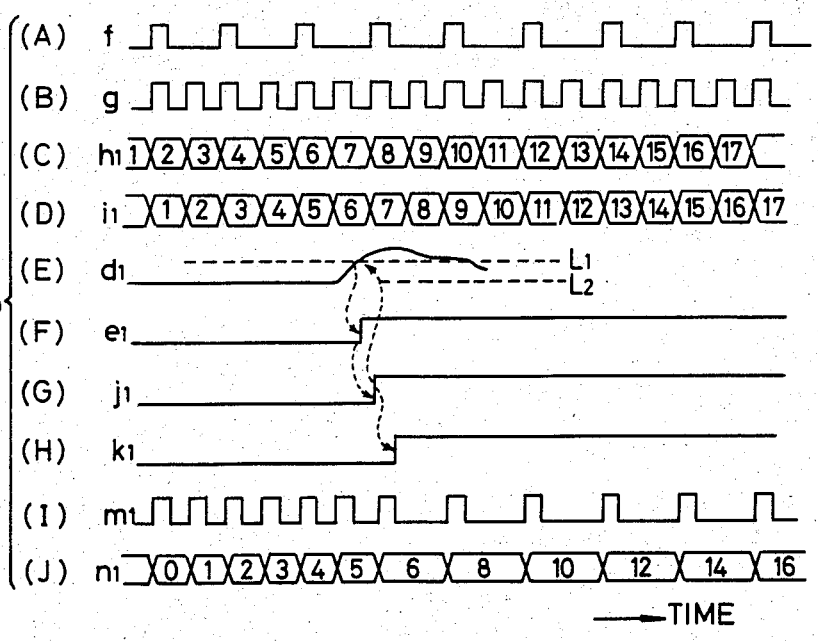

The present invention has eliminated the disadvantage of the conventional video signal processing apparatus described heretofore, and a description will now be given with respect to an embodiment of the video signal processing apparatus according to the present invention by referring to FIGS. 4 through 8. In FIG. 4, those parts which are the same as those corresponding parts in FIG. 1 are designated by the same reference numerals, and their description will be omitted.

First, a description will be given with respect to the operation of the block system shown in FIG. 4 in the case where the original picture is a still picture. In the case where the original picture is a still picture, a luminance signal a shown in FIG. 5(A) is obtained from the separating circuit 12 in the first field, and a luminance signal b shown in FIG. 5(B) having the same waveform as the luminance signal a is obtained from the separating circuit 12 in the third field, for example. In this case, a digital luminance signal h shown in FIG. 6(C) is obtained from the frame memory 30, which digital luminance signal h corresponds to a signal c shown in FIG. 5(C) which has the same waveform as the signals a and b shown in FIGS. 5(A) and 5(B). In FIGS. 5(A) through 5(E), the signal waveform is illustrated for one line. But in FIGS. 6(A) through 6(J), the signal waveform is illustrated in terms of picture element data. Accordingly, numerals indicated in the waveform in FIGS. 6(C), 6(D), and 6(J) represent the numbers (positions) of the picture elements in one line. Similarly, the signal waveforms are illustrated for one line in FIGS. 7(A) through 7(E) and the signal waveforms are illustrated in terms of picture element data in FIGS. 8(A) through 8(J) which will be described later on in the specification.

The digital luminance signal h is supplied to a D/A converter 32 within a filter circuit 31. The filter circuit 31 comprises the D/A converter 32, a filter 33, and an integrator 34. The digital luminance signal h is converted into an analog signal in the D/A converter 32, and the filter 33 supplies only the high frequency component of the analog signal to the integrator 34. Hence, the integrator 34 produces a signal d shown in FIGS. 5(D) and 6(E), and applies the signal d to one input terminal of a comparator 36 within a movement detecting circuit 35. The movement detecting circuit 35 constitutes a luminance difference detecting part together with the filter circuit 31. As will be described later, the luminance difference detecting part performs a detecting operation to detect a luminance difference between two luminance data which are related to two mutually adjacent picture element data in the same line and are among the picture element data corresponding to one field.

The movement detecting circuit 35 comprises the comparator 36, a selector 37, a D/A converter 38, latch circuits 39 and 40, and an inverter 41. Initially, the selector 37 selectively produces a threshold value $L_1$ of a higher level. The threshold value $L_1$ is converted into an analog signal in the D/A converter 38, and an output signal of the D/A converter 38 is applied to the other input terminal of the comparator 36. The comparator 36 compares the level of the signal d and the threshold value $L_1$, and produces a low-level signal e shown in FIGS. 5(E) and 6(F). The latch circuit 39 latches the signal e responsive to an output clock pulse g (FIG. 6(B)) of the oscillator 20 within the frame memory 30 shown in FIG. 1, and a low-level signal j shown in FIG. 6(G) is supplied to the latch circuit 40. The latch circuit 40 latches the signal j responsive to a signal which is obtained by passing the clock pulse g through the inverter 41, and a low-level signal k shown in FIG. 6(H) is applied to an inverter 44 and to one input terminal of a 2-input NAND circuit 45 within an interpolation circuit 43.

The interpolation circuit 43 comprises the inverter 44, 2-input NAND circuits 45 and 46, a NOR circuit 47, and a latch circuit 48. The interpolation circuit 43 constitutes an interpolation part together with a delay circuit 49 which comprises a latch circuit 50 and a frequency divider 51. As will be described later, when the luminance difference detecting part described before detects a luminance difference between two luminance data related to two mutually adjacent picture elements in the same line among the picture element data corresponding to one field during two or more consecutive detecting operations, the interpolation part replaces the luminance data which are obtained before the luminance difference is detected by corresponding luminance data among the picture element data which correspond to one field and are obtained after the luminance difference is detected.

The digital luminance signal h from the frame memory 30 is latched by a latch circuit 50 within the delay circuit 49, responsive to the clock pulse g from the frame memory 30. The latch circuit 50 supplies a luminance signal i shown in FIG. 6(D) to the latch circuit 48 within the interpolation circuit 43. On the other hand, the clock pulse signal g from the frame memory 30 is frequency-divided by ½ in the frequency divider 51, and a signal f shown in FIG. 6(A) is applied to the other input terminal of the NAND circuit 45.

Since the low-level signal k is applied to the one input terminal of the NAND circuit 45, a high-level signal is produced from the NAND circuit 45 and is applied to one input terminal of the NOR circuit 47. On the other hand, the clock pulse from the frame memory 30 is applied to the other input terminal of the NAND circuit 46. Because a high-level signal obtained by inverting the signal k is applied to the one input terminal of the NAND circuit 46, an inverted signal of the clock pulse g is produced from the NAND circuit 46. This inverted signal of the clock pulse g is applied to the other input terminal of the NOR circuit 47. Hence, a signal m shown in FIG. 6(I) which is substantially the same as the clock pulse g, is obtained from the NOR circuit 47. The latch circuit 48 latches the luminance signal i responsive to the signal m, and a luminance signal n shown in FIG. 6(J) is obtained from the latch circuit 48. The luminance signal n is a signal obtained by simply delaying the luminance signal h. The output luminance signal n of the latch circuit 48 is converted into an analog luminance signal in the D/A converter 24, and the analog luminance signal is supplied to the mixer 25.

The output carrier chrominance signal of the separating circuit 12 is passed through a delay circuit 52 so as to match the timing with the luminance signal, and the delayed carrier chrominance signal is supplied to the mixer 25. As a result, a video signal is produced through the output terminal 27.

As described before, no movement takes place between the first and third fields (or second and fourth fields) in the case where the original picture is a still picture, and this is detected by the movement detecting circuit 35. The interpolation circuit 43 produces the digital luminance signal with the timing of the signal m which has the same timing as the clock pulse g, responsive to the above detection made in the movement detecting circuit 35.

Next, a description will be given with respect to the operation of the block system shown in FIG. 4 in the case where the original picture is a moving picture such as a picture of a moving automobile. In the case where the original picture is a moving picture, a luminance signal $a_1$ shown in FIG. 7(A) is obtained from the separating circuit 12 during the first field and a luminance signal $b_1$ shown in FIG. 7(B) is obtained from the separating circuit 12 during the third field, for example. In this case, a digital luminance signal $h_1$ shown in FIG. 8(C) is obtained from the frame memory 30, which digital luminance signal $h_1$ corresponds to a signal $c_1$ shown in FIG. 7(C) which is obtaned by sampling the signal levels shown in FIGS. 7(A) and 7(B) with a period of the sampling pulse g shown in FIG. 8(B).

The digital luminance signal $h_1$ is passed through the filter circuit 31, and a signal $d_1$ shown in FIGS. 7(D) and 8(E) is obtained from the integrator 34. The signal $d_1$ is supplied to one input terminal of the comparator 36. The comparator 36 compares the level of the signal $d_1$ with the threshold value $L_1$ having the higher level, and produces a signal $e_1$ shown in FIGS. 7(E) and 8(F) which undergoes a transition from a low level to a high level. Hence, an output signal $j_1$ of the latch circuit 39 shown in FIG. 8(G) undergoes a transition from a low level to a high level. The selector 37 is switched responsive to the transition in the signal $j_1$ so as to selectively produce a threshold value $L_2$ having a lower value compared to the threshold value $L_1$. In addition, the latch circuit 40 supplies a signal $k_1$ shown in FIG. 8(H) to one input terminal of the NAND circuit 45.

The NAND circuit 45 performs a NAND operation between the signal $k_1$ and the signal f shown in FIG. 8(A). Thus, from a time when the signal $k_1$ undergoes a transition and assumes a high level, the NAND circuit 45 supplies to one input terminal of the NOR circuit 47 an inverted signal of the signal f. On the other hand, the NAND circuit 46 performs a NAND operation between the clock pulse g and an inverted signal of the signal $k_1$. Accordingly, from a time when the signal $k_1$ undergoes a transition and assumed a high level, the NAND circuit 46 supplies a high-level signal to the other input terminal of the NOR circuit 47. Consequently, a signal $m_1$ shown in FIG. 8(I) is obtained from the NOR circuit 47. As may be seen from FIG. 8(I), the signal $m_1$ has the same timing as the clock pulse g during the low-level period of the signal $k_1$, and has the same timing as the signal f during the high-level period of the signal $k_1$.

The latch circuit 48 latches a luminance signal $i_1$ shown in FIG. 8(D) responsive to the signal $m_1$. Thus, a luminance signal $n_1$ shown in FIG. 8(J) is produced from the latch circuit 48. As shown in FIG. 8(J), the latch circuit 48 latches the luminance data with the same timing as the clock pulse g up to the fifth picture element data, but latches the luminance data with the same timing as the signal f which is obtained by frequency-dividing the clock pulse g by 178 from the sixth picture element data. Therefore, only the picture element data of the third field are obtained from the latch circuit 48, and the picture element data of the first field in which there is movement are not obtained from the latch circuit 48. In other words, the picture element data of the third field are obtained instead of the picture element data of the first field. Accordingly, the double picture shown in FIG. 3 will not be obtained according to the present invention.

The replacement (interpolation) of the picture element data is performed between the first and third fields in the description given heretofore, but the interpolation of the picture element data can be performed similarly between the second and fourth fields.

When the level of the output signal $d_1$ of the integrator 34 becomes less than or equal to the threshold value $L_2$, the output signal level of the comparator 36 becomes low. Consequently, the output signal level of the latch circuit 39 also becomes low. The selector 37 is switched responsive to the low-level output signal of the latch circuit 39 so as to selectively produce the original threshold value $L_1$. As a result, the system shown in FIG. 4 is returned to the initial state.

For example, when there is movement between the first and third fields, the output signal $d_1$ of the integrator 34 may become less than or equal to the threshold value $L_1$ as shown in FIG. 7(D). However, the double picture will be obtained in this case if the original picture is erroneously discriminated as being a still picture. For this reason, the present embodiment uses two threshold values $L_1$ and $L_2$ in order to prevent the original picture from being erroneously discriminated as a still picture even in a case such as the case shown in FIG. 7(D).

Further, the present invention is not limited to these embodiments, but various variations and modifications may be made without departing from the scope of the present invention.

What is claimed is:

1. A video signal processing apparatus for processing a video signal which is transmitted in accordance with a dot interlaced scanning system and inputted thereto, said video signal being obtained by carrying out a dot interlaced scanning in terms of four fields so that picture element data related to odd numbered picture elements in odd lines and picture element data related to even numbered picture elements in even lines are sampled and transmitted during the first and second fields and picture element data related to even numbered picture elements in odd lines and picture element data related to odd numbered picture elements in even lines are sampled and transmitted during the third and fourth fields, said video signal processing apparatus comprising:

first separating means for separating a luminance signal and a carrier chrominance signal from said video signal;

analog-to-digital converting means supplied with the luminance signal from said first separating means for subjecting the luminance signal to an analog-to-digital conversion to produce a digital luminance signal;

second separating means for separating synchronizing signals from said video signal;

memory means for writing therein and reading out therefrom the digital luminance signal, said memory means comprising clock pulse generating means for generating clock pulses, said memory means writing therein and reading therefrom the digital luminance signal responsive to the synchronizing signals which are separated by said second separating means and the clock pulse which is generated by said clock pulse generating means so that a digital luminance signal which corresponds to one field and in which luminance data of first and third dot interlaced fields alternately exist in each line is obtained during a certain time period of one field and a digital luminance signal which corresponds to one field and in which luminance data of second and fourth dot interlaced fields alternately exist in each line is obtained during a subsequent time period of one field;

luminance difference detecting means supplied with the digital luminance signal which is read out from said memory means for performing a detecting operation to detect a luminance difference between two digital luminance data which belong respectively to said first and third dot interlaced fields or belong respectively to said second and fourth dot interlaced fields and are in the same line and are within the digital luminance signal corresponding to one field, said luminance difference detecting means producing an output detection signal when the luminance difference is detected during two or more consecutive detecting operations;

interpolation means supplied with the digital luminance signal from said memory means for producing an interpolated digital luminance signal, said interpolation means normally passing the digital luminance signal in the absence of the output detection signal of said luminance difference detecting means, said interpolation means replacing one digital luminance data out of said two digital luminance data by the other digital luminance data in response to the output detection signal of said luminance difference detecting means;

digital-to-analog converting means for producing an analog luminance signal by subjecting the interpolated digital luminance signal to a digital-to-analog conversion;

delay means supplied with the carrier chrominance signal from said first separating means for delaying the carrier chrominance signal by a predetermined delay time to produce a delayed carrier chrominance signal; and mixing means for mixing said analog luminance signal and said delayed carrier chrominance signal and for producing a video signal.

2. A video signal processing apparatus as claimed in claim 1 in which said luminance difference detecting means comprises a filter circuit and a movement detecting circuit, said filter circuit comprises a digital-to-analog converter for subjecting the digital luminance signal which is read out from said memory means to a digital-to-analog conversion and integrating means for integrating a high frequency component of an output signal of said digital-to-analog converter, and said movement detecting circuit comprises a comparator for comparing the level of an output signal of said intergrating means and a predetermined threshold value so as to detect a movement in a picture between the first and third fields or between the second and fourth fields.

3. A video signal processing apparatus as claimed in claim 2 in which said movement detecting circuit further comprises threshold value generating means, and said threshold value generating means supplies a first threshold value having a higher level to said comparator in an initial state and supplies a second threshold value having a lower level compared to said first threshold value responsive to an output signal of said comparator when the output signal level of said integrating means becomes greater than said first threshold value.

4. A video signal processing apparatus as claimed in claim 3 in which said threshold value generating means supplies said first threshold value to said comparator responsive to the output signal of said comparator when the output signal level of said integrating means becomes less than or equal to said second threshold value.

5. A video signal processing apparatus as claimed in claim 2 in which said movement detecting means further comprises a latch circuit means for latching an output signal of said comparator responsive to the output clock pulse of said clock pulse generating means and for producing said detection signal.

6. A video signal processing apparatus as claimed in claim 1 in which said interpolation means comprises a delay circuit and an interpolation circuit, said delay circuit comprises a first latch circuit responsive to said clock pulse for latching the digital luminance signal which is read out from said memory means and a frequency divider for frequency-dividing said clock pulse by $\frac{1}{2}$, and said interpolation circuit comprises gate means for passing said clock pulse during a time period in which said output detection signal of said luminance difference detecting means is absent and for passing an output signal of said frequency divider during a time period in which said output detection signal of said luminance difference detecting means exists and a second latch circuit for latching an output digital luminance signal of said first latch circuit responsive to an output signal of said gate means.

7. A video signal processing apparatus as claimed in claim 6 in which said gate means comprises a first NAND circuit supplied with the output detection signal of said luminance difference detecting means and the output signal of said frequency divider, an inverter for inverting said detection signal, a second NAND circuit supplied with an output signal of said inverter and said clock pulse, and a NOR circuit supplied with output signals of said first and second NAND circuits, and said second latch circuit latches the output digital luminance signal of said first latch circuit responsive to an output signal of said NOR circuit.

* * * * *